(12) United States Patent
Christensen et al.

(10) Patent No.: US 6,748,810 B2
(45) Date of Patent: Jun. 15, 2004

(54) LOAD SENSOR

(76) Inventors: Bill Christensen, 7893 Loyola Crescent, Prince George, British Columbia (CA), V2N 3V3; Jeff Gruending, 1139 Ewert Street, Prince George, British Columbia (CA), V2N 2P3

( * ) Notice: Subject to any disclaimer, the term of this patent is extended or adjusted under 35 U.S.C. 154(b) by 0 days.

(21) Appl. No.: 10/071,504

(22) Filed: Feb. 11, 2002

(65) Prior Publication Data

US 2003/0150276 A1 Aug. 14, 2003

(51) Int. Cl.$^7$ ................................................ G01N 3/00
(52) U.S. Cl. ........................................................ 73/795
(58) Field of Search ............................. 73/795, 862.66, 73/862.045, 862.474, 862.67, 777, 766, 862.65, 862.632, 862.631; 177/211

(56) References Cited

U.S. PATENT DOCUMENTS

| | | |
|---|---|---|
| 3,116,469 A | 12/1963 | Wu |
| 3,137,834 A | 6/1964 | Pfann |
| 3,853,000 A * | 12/1974 | Barnett et al. ............ 73/88.5 R |
| 4,064,744 A | 12/1977 | Kistler |
| 4,332,174 A * | 6/1982 | Suzuki et al. ............. 73/862.65 |
| 4,596,155 A * | 6/1986 | Kistler ..................... 73/862.65 |
| 4,718,287 A * | 1/1988 | Mishliborsky ........... 73/862.65 |
| 4,789,035 A * | 12/1988 | Hamilton ..................... 177/211 |
| 4,996,882 A | 3/1991 | Kistler |
| 5,174,159 A | 12/1992 | Jacobsen et al. |
| 5,220,971 A | 6/1993 | Farr |
| 5,313,022 A | 5/1994 | Piroozmandi et al. |
| 5,734,110 A | 3/1998 | Kosmal |
| 5,777,234 A | 7/1998 | Kosmal |
| 6,005,199 A * | 12/1999 | Harada et al. ............... 177/211 |
| 6,225,576 B1 | 5/2001 | Poole et al. |

* cited by examiner

Primary Examiner—Edward Lefkowitz
Assistant Examiner—Octavia Davis
(74) Attorney, Agent, or Firm—Paul Smith Intellectual Property Law; Paul Smith

(57) ABSTRACT

A deflection sensing assembly comprises a square plate with attachment holes in each of the four corners for attachment to a structural element along which deflection is to be measured. The sensor is attached to the structural element such that only two opposed corners of the plate lie along the deflection axis. The sensor assembly is removably attachable and it has been found that there is a high degree of independence between deflections in the temperature compensation axis and deflections in the deflection axis.

11 Claims, 9 Drawing Sheets

LOAD SENSOR

FIELD OF THE INVENTION

This invention relates to strain sensing instruments for measuring weights and loads. More specifically, the invention relates to a bolt-on, temperature compensated strain sensor which can be used to provide load measurements and to a remote access system for conveying load data for containers.

BACKGROUND OF THE INVENTION

Load measurement is required in industrial settings in order to determine whether a container is empty, partially full or full and therefore whether it needs to be serviced. The use of strain gauges in such applications is well known.

It is known to provide at least two strain gauges oriented at 90 degrees from one another and connected in a balanced bridge configuration in order to provide partial compensation for the mechanical deformation of the load structure induced by temperature changes rather than load. U.S. Pat. No. 3,116,469 to Wu teaches the placement of two strain gauges at 90 degrees to one another. The strain gauges are mounted on a shim, which is then secured to the structure to be measured by way of a single weld line. In such an arrangement, the principal strain axis does not pass directly through the strain sensitive gauge. In addition, welding the shim to the load structure when the gauges are already mounted on the shim risks inducing distortion and errors in the gauges.

It is also known in the art to supply a strain sensor comprising one or more strain gauges mounted on a plate and bolting the plate to the support structure of the container to be measured. U.S. Pat. No. 4,064,744 to Kistler teaches such a bolt-on strain sensor with increased sensitivity. Two strain gauges are mounted, one on each side of a slender metallic beam formed transversely within a mounting plate. The transverse beam is located along an axis defined by the two bolt attachment points of the strain sensor plate. The connections of the main body of the plate to the beam are such that compression or expansion of the plate will deflect the beam, which deflection is applied as a strain on the gauges mounted on the sides of the beam. While temperature compensation effects are discussed in the patent, Kistler acknowledges that the design may still be adversely affected by variations in temperature of the support structure.

One method adopted to overcome this deficiency is to install in a rosette pattern a pair of the bolt-on strain sensors taught in the '744 patent. The pair of strain sensors are wired together in such a way that signals generated by temperature-induced strain substantially cancel each other out. This reduces errors caused by thermal effects. However, in order to ensure the accuracy of this system, the pair of separate sensors must be installed at precisely 90 degrees to one another, which can be difficult to accomplish in field conditions. Ensuring the requisite level of accuracy is also time consuming and costly.

The bolt-on strain sensor taught in U.S. Pat. No. 5,734,110 to Kosmal was designed to overcome this deficiency by forming the sensor in an L configuration, such that the strain gauges are already pre-set at 90 degrees to one another. Along each axis of the L are two mounting holes, with one mounting hole being common to each axis, for a total of three mounting holes. Strain gauges, each of the design taught in the '744 patent, are placed along each axis.

Typically in the load measurement industry, the objective is to determine the weight or mass of material in a bin as precisely as possible. As a result, load measurement systems are made as sensitive as possible, including attempting to account for non-linearities, by means of additional sensors and circuit means. However, the present invention recognizes that for many applications, precise measurement of load status is not required. It is often sufficient for a party servicing a bin or a container, for example a dump truck driver, or a trucker attending from time to time at a sawmill to retrieve wood chip bins, to know only whether the bin is empty, full or partly full.

It is one object of the present invention to provide a load-sensitive, bolt-on load sensor that has effective partial temperature compensation.

It is another object of the invention to provide a load sensor that is easy to calibrate in the field.

It is a further object of the invention to provide a load sensor and data delivery system that enables remote operators to determine the load status of containers to facilitate the timing of servicing of the containers.

These and other objects of the invention will be appreciated by reference to the summary of the invention and the detailed description of the preferred embodiment that follows. It is noted that the foregoing objects are not necessarily met simultaneously in all aspects of the invention defined by each claim.

SUMMARY OF THE INVENTION

The load sensor according to the invention is designed to be mounted on a structure that is subjected to loading, for example a support beam for a load-carrying bin.

The sensor comprises a square plate having a mounting hole at each of its four corners. A first axis extends through diagonally opposed corners of the plate and a second axis extends through the other two diagonally opposed corners of the plate. A strain gauge is mounted along the first axis, preferably such that it also lies along the second axis.

In the preferred embodiment, the strain gauge has four strain sensing elements set in a square pattern. A first diagonally opposed pair of the elements is aligned such that their axis of sensitivity is parallel to the first axis. A second diagonally opposed pair of the elements is aligned such that their axis of sensitivity is parallel to the second axis.

The four elements of the strain gauge are connected in a standard temperature-compensating Wheatstone full bridge configuration.

The square plate is bolted onto the load structure such that the first axis corresponds to the principal strain axis along which strain is to be measured. For example, when measuring strain along a vertical support beam for a load-carrying structure, the plate is arranged on the beam in a vertical diamond configuration. Two diagonally opposed corners of the plate defining the first axis are positioned to lie along the vertical axis and the other two diagonally opposed corners defining the second axis lie along the horizontal axis. As a result, the two strain gauge elements whose axes of sensitivity are parallel to the horizontal axis act as temperature-compensating elements.

The assembly of the invention acts to effectively sense deflection of the load structure as a result of loading of the structure.

In an alternative embodiment, two dual-element strain gauges are used rather than a single multi-element gauge. A first strain gauge is mounted along a first axis extending through two diagonally opposed corners of the plate. A second strain gauge, used as a partial temperature-compensating element, is mounted along the axis extending through the other two diagonally opposed corners of the plate. The first and second strain gauges are again connected in a standard temperature-compensating Wheatstone full bridge configuration.

The inventors have found that the configuration of the invention significantly increases sensitivity of the sensor to strain along the principal strain axis while minimizing temperature or other stray effects, as compared to orienting the strain gauge and the plate in the same orientation.

A printed circuit board is mounted on four stand-offs so as to directly overlay the strain gauge elements and to sandwich them between the plate and the printed circuit board. The printed circuit board includes lead-throughs to extend leads from the strain gauge elements to traces on the distal surface of the board. A protective cap is secured with epoxy to the surface of the plate and encloses the strain gauge elements, leads and printed circuit board.

An on-site controller is installed in the general vicinity of the load structures being measured. The controller includes a micro-controller, a digital potentiometer, load status LEDs and calibration buttons. The digital potentiometer is connected to the bridge and controlled by the micro-controller to automatically balance the Wheatstone bridge circuit when a zero load calibration button is pressed. The potentiometer then balances the bridge and is held at the resulting potentiometer setting until calibration is once again initiated. The balancing of the bridge results in a substantially zero output voltage across the bridge. When a full load calibration button is pressed, the output voltage across the bridge is measured and is recorded in memory as the full load value. Subsequent output voltage readings are used to interpolate between the zero output voltage value and the full load value so as to deduce the load status of the container. Processing means are provided to manage load information and calibration for a plurality of sensors.

The assembly may be used in a system for allowing remote parties to determine the load status of bins for the purpose of determining whether to service the bins. In this application, the micro-controller averages the input from a plurality of sensors mounted on the several support beams of a bin. The results are compensated for wind, vibration and other effects to produce a final measured value of the bin load or of its fill status. The controller system further includes a modem to communicate bin load or fill status to a remote base station computer. The base station computer includes a web server having a user interface for making available over the Internet the bin load/fill status. Such information allows, for example, truckers attending at a sawmill to minimize wait times.

The ability to deliver to remote locations load status information will also be of value in applications involving load structures other than bins or containers, such as shelves, vehicles, etc.

In one aspect, the preferred embodiment of a load sensor assembly according to the invention comprises a substantially square plate with a hole in each of four corners of the plate for receiving a fastener. The plate has a first axis defined by a first pair of diagonally opposed holes and a second axis defined by a second pair of diagonally opposed holes. A strain a strain gauge secured to said plate.

In a further aspect, the strain gauge of the load sensor assembly has at least two uniaxial strain elements, where each of the uniaxial strain elements has an axis of sensitivity. The uniaxial strain elements are oriented within the strain gauge such that their respective axes of sensitivity are perpendicular to one another.

In a further aspect, the strain gauge is secured to the plate such that one of the axes of sensitivity is parallel to the first axis and the other of the axes of sensitivity is parallel to the second axis.

In yet another aspect, the strain gauge is mounted substantially centered on the plate.

In yet another aspect, the strain gauge has four uniaxial strain elements in a square pattern. A first pair of diagonally opposed elements have axes of sensitivity oriented parallel to the first axis, while a second pair of diagonally opposed elements have axes of sensitivity oriented parallel to the second axis.

In yet another aspect, the load sensor has a plurality of standoffs mounted on the plate such that the standoffs do not lie on either the first or second axes. A printed circuit board is mounted on the standoffs and overlays the strain gauge. The printed circuit board contains traces defining a Wheatstone full bridge configuration including the four elements of the strain gauge, and lead-throughs for establishing electrical connection between the traces and a plurality of leads emanating from the strain gauge. The leads extend from the strain gauge through the lead-throughs. The plate has substantially straight sides. A cover mounted on the plate to cover the standoffs, printed circuit board and strain gauge, the cover being oriented such that its corners lie along lines bisecting the straight sides of the plate.

In another aspect, the cover has a square cross section and is mounted to the plate to overlie the strain gauge such that each of its sides is perpendicular to either the first or second axis.

In another embodiment, the invention comprises a method of detecting strain in a structure comprising mounting a load sensor assembly on the structure by inserting fastening elements through the holes of the sensor plate such that the first axis lies along a principal strain axis along which strain is to be measured.

In another embodiment, a load sensor assembly according to the invention comprises a square plate having a hole in each of its four corners. Each hole is for receiving a fastener. A first uniaxial strain gauge is secured to the plate along a first axis defined between a first pair of diagonally opposing holes. A second uniaxial strain gauge is secured to the plate along a second axis defined by a second pair of diagonally opposed holes.

In another aspect, the load sensor assembly further comprises a digital potentiometer in parallel with the bridge configuration, at least one zero load calibration button and at least one full load calibration button, and control means responsive to the zero load calibration button to cause the potentiometer to adjust so as to balance the bridge.

In another embodiment, the invention comprises a load sensing system for providing information regarding the load status of a remote container. The system has a load sensor assembly comprising a square plate having a hole in each of four corners of the plate for receiving a fastener therethrough. The plate has a first axis defined by a first pair of diagonally opposed holes and a second axis defined by a second pair of diagonally opposed holes. A strain gauge is secured to the plate. Processing means are associated with the container for determining the load status based on an output of the strain gauge. There are also communication means for transmitting load status information to a remote server, database means associated with the remote server for correlating the load status to one of a plurality of remote individual containers, and a web server for displaying the load status information.

In another aspect, the load assembly of the load sensing system further comprises a plurality of standoffs mounted on the plate, so as not to lie on either the first or second axes. A printed circuit board is mounted on the standoffs and directly overlays the strain gauge. The printed circuit board contains traces defining a Wheatstone full bridge configuration including the strain gauge, and lead-throughs for establishing electrical connection between the traces and a plurality of leads emanating from the strain gauge. The leads extend from the strain gauge through the lead-throughs. A cover is mounted on the plate to cover the standoffs, printed circuit board and strain gauge, and is oriented such that its corners lie along lines bisecting the straight sides of the plate.

In another embodiment, a load sensing apparatus comprises at least two strain sensing elements and a Wheatstone bridge circuit comprising the at least two strain sensing elements. A digital potentiometer is connected to the bridge circuit. There are also processing means for causing the digital potentiometer to adjust so as to balance the Wheatstone bridge.

In another aspect, the Wheatstone bridge circuit of the load sensing apparatus comprises at least four strain sensing elements rigidly associated with a mounting plate, wherein a first pair of the elements are oriented on the mounting plate along a principal strain axis thereof, and a second pair of the elements are oriented on the mounting plate perpendicular to the principal strain axis.

In another aspect, the plate of the load sensing apparatus is square and the principal strain axis is defined as an axis extending between two opposed corners of the plate.

These and other aspects of the invention will be appreciated by reference to the detailed description of the preferred embodiment and to the claims, which are incorporated in this summary in their entirety by reference.

BRIEF DESCRIPTION OF THE DRAWINGS

The detailed description of the preferred embodiment of the invention will be described by reference to the drawings thereof in which.

DETAILED DESCRIPTION OF THE PREFERRED EMBODIMENT OF THE INVENTION

Figures 1, 2:
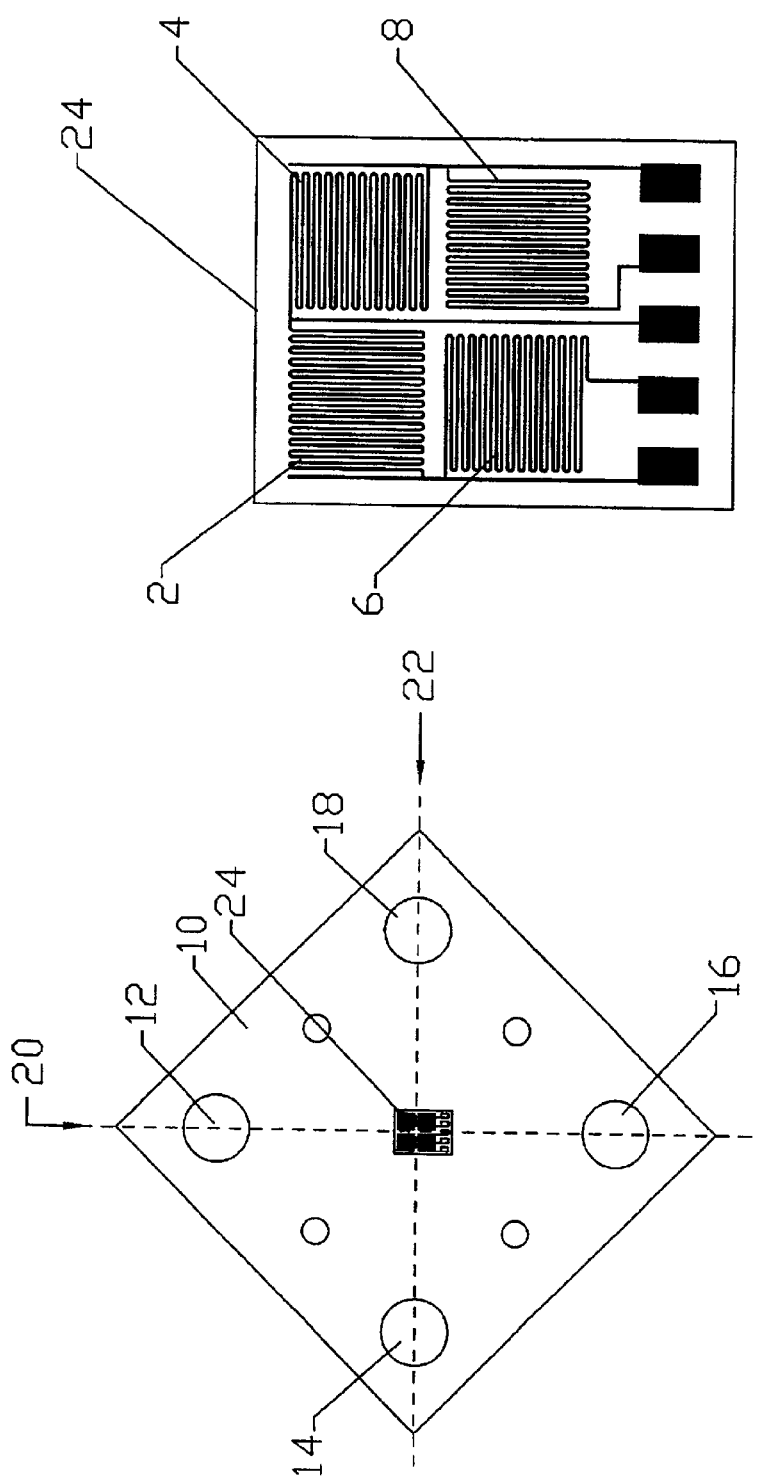
FIG. 1 is a plan view of a plate and strain gauge of a load sensor according to the preferred embodiment of the invention.
FIG. 2 is a plan view of a four-element strain gauge according to the preferred embodiment of the invention.
Figures 3A, 3B:
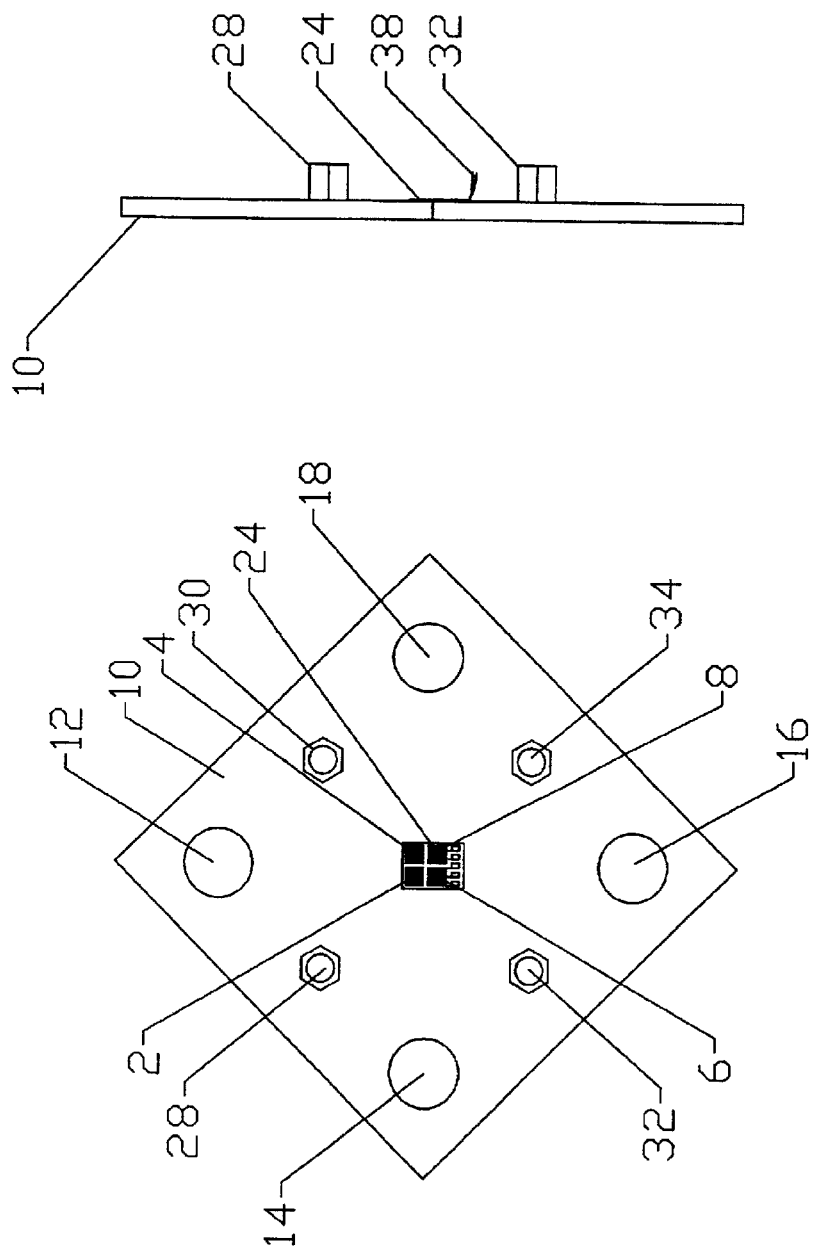
FIGS. 3A and 3B are plan and side views respectively of the load sensor of FIG. 1 with attached standoffs.

Referring to FIG. 1, a square plate 10 is provided with mounting holes 12, 14, 16 and 18 at each corner of the plate. The mounting holes are adapted to receive fasteners such as bolts to secure the plate to a load structure.

In the preferred embodiment, the assembly according to the invention is used to measure the load carried by a bin by measuring the strain on vertical beams supporting the bin. For such application, a mild steel plate having a thickness of about 3.18 millimeters (⅛ inch) has been used. It will of course be appreciated that plate materials and thicknesses having different mechanical deformation properties will be suitable for different intended applications.

For the purposes of this disclosure, a principal strain axis 20 of the plate is defined by a first pair of diagonally opposed corner holes 12 and 16. A temperature compensation axis 22 is defined by a second pair of diagonally opposed holes 14 and 18. Since the plate is square, principal strain axis 20 and temperature compensation axis 22 are perpendicular.

According to the preferred embodiment, a strain gauge 24 having four elements 2, 4, 6 and 8 is ideally mounted on the plate so as to be centered along both the principal strain axis 20 and the temperature compensation axis 22. In this way, each of the four elements is located an equal distance from each axis such that each element will undergo the same distortion from deflection and temperature induced strains in the plate. Proximity to the two axes also leads to increased sensitivity.

The four elements 2, 4, 6, and 8 are each uniaxial strain elements. Uniaxial strain elements are sensitive to strain substantially along a single axis. The four elements 2, 4, 6, and 8 are arranged in a square pattern, with adjacent elements oriented with their axes of sensitivity at precisely 90 degrees to each other. Diagonally opposed elements therefore have the same orientation. The four-element gauge of the preferred embodiment is illustrated in FIG. 2.

In the preferred embodiment, strain gauge 24 is an FAE-10S-35SXE-R by BLH Electronics. Preferably strain gauge 24 is selected to have thermal drift characteristics matched to those of the material from which the plate is made.

As is known in the industry, the surface of the plate is first etched, the strain gauge 24 is glued and baked onto the plate, and wax and other protective components are layered over the gauge according to known practice.

Figure 6:
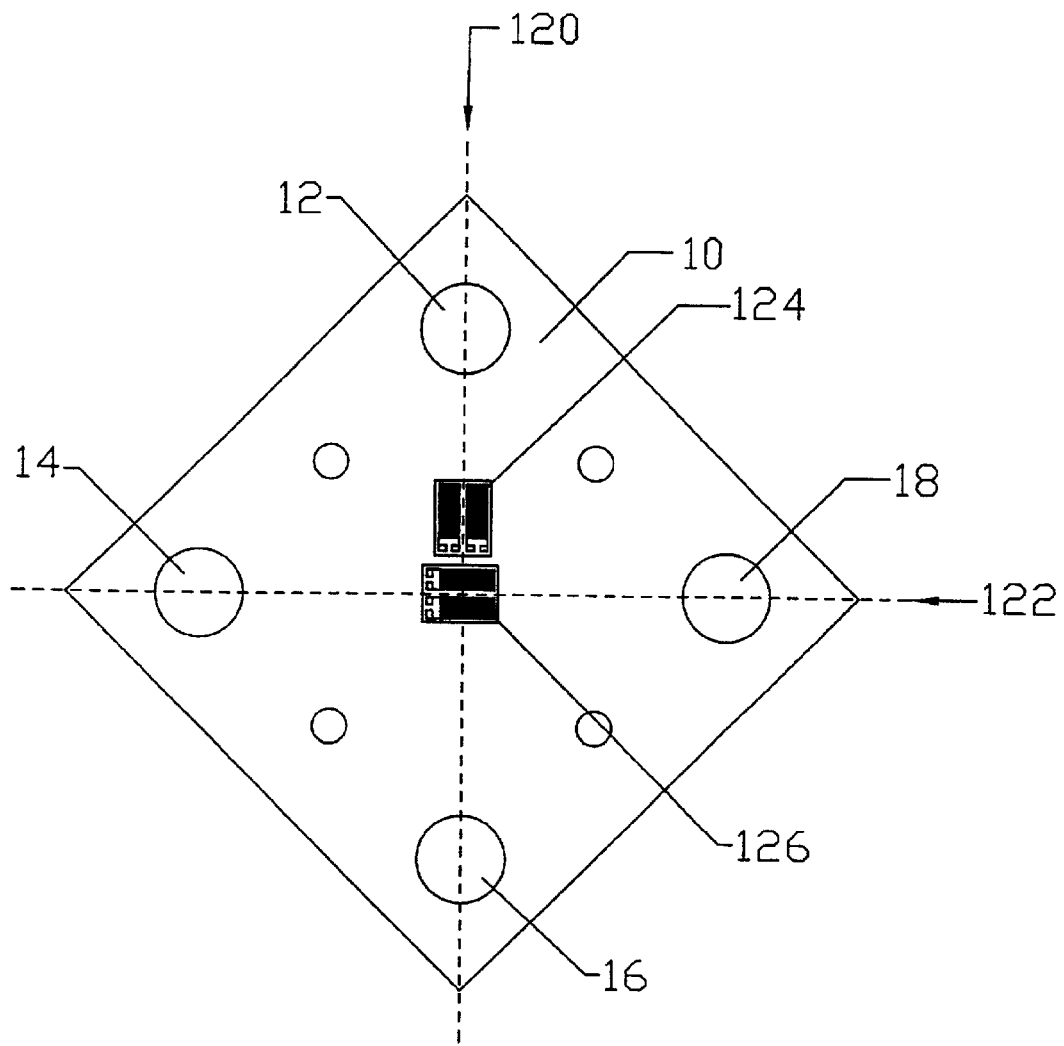
FIG. 6 is a plan view of a plate and strain gauge of a load sensor according to an alternative embodiment of the invention.

Alternatively, as shown in FIG. 6, a first strain gauge 124 is mounted on the plate 10 so as to be centered along a principal strain axis 120. A second strain gauge 126, which is to act as a partial temperature-compensating element in the Wheatstone bridge circuit, is mounted so as to be centered along a temperature-compensating axis 122.

In this alternative embodiment, strain gauges 124 and 126 are uniaxial dual element strain gauges, also having thermal drift characteristics matched to those of the plate material. The strain gauges 124 and 126 are attached to the surface of the plate as described above for the preferred embodiment.

Figure 4A:
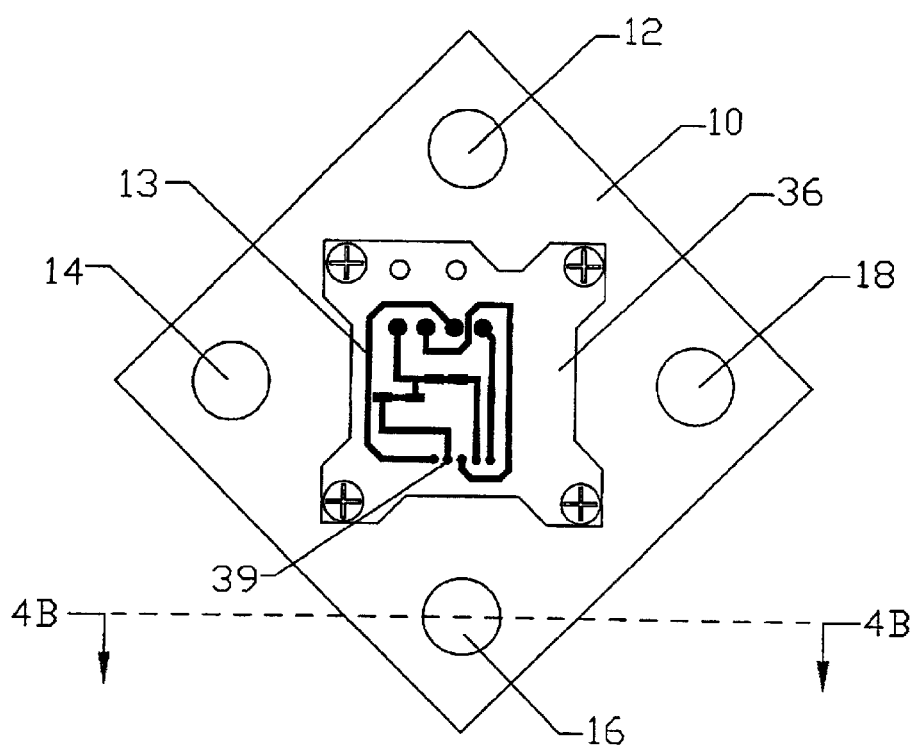
FIGS. 4A, 4B and 4C are plan, side and perspective views respectively of the load sensor of FIGS. 3A and 3B with attached circuit board.
Figure 4B:
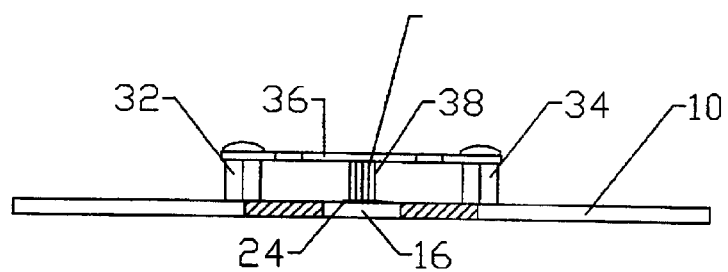
Figure 4C:
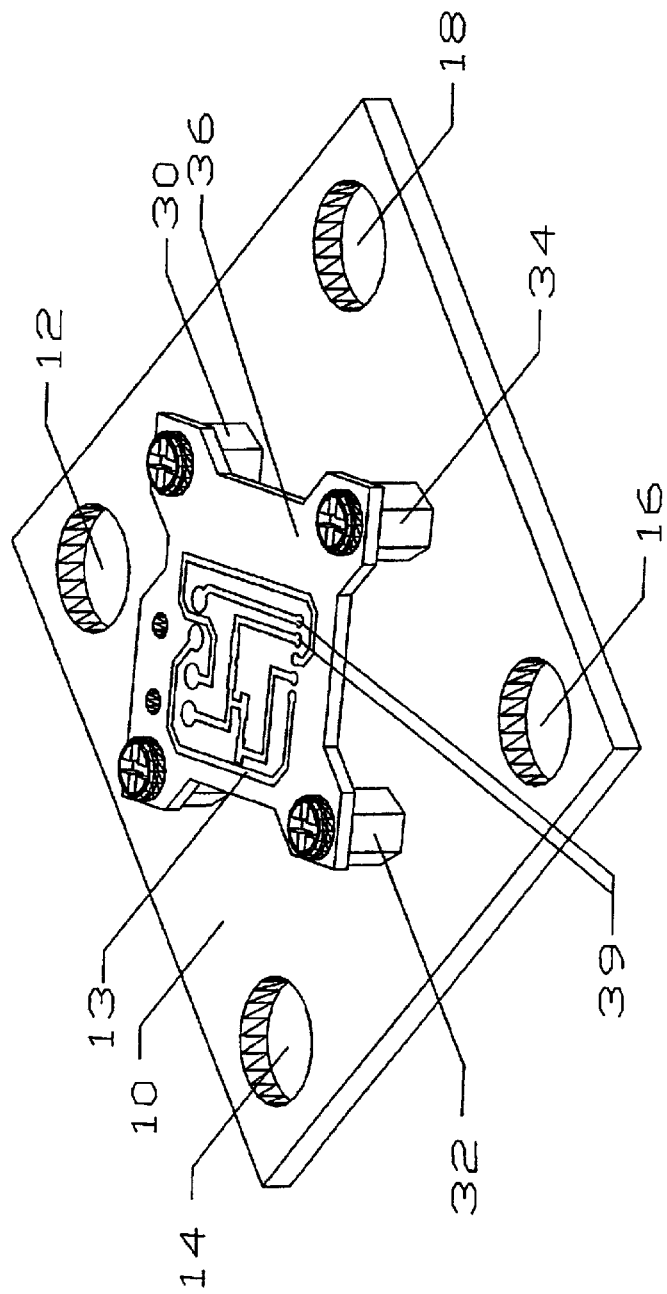
Figure 5:
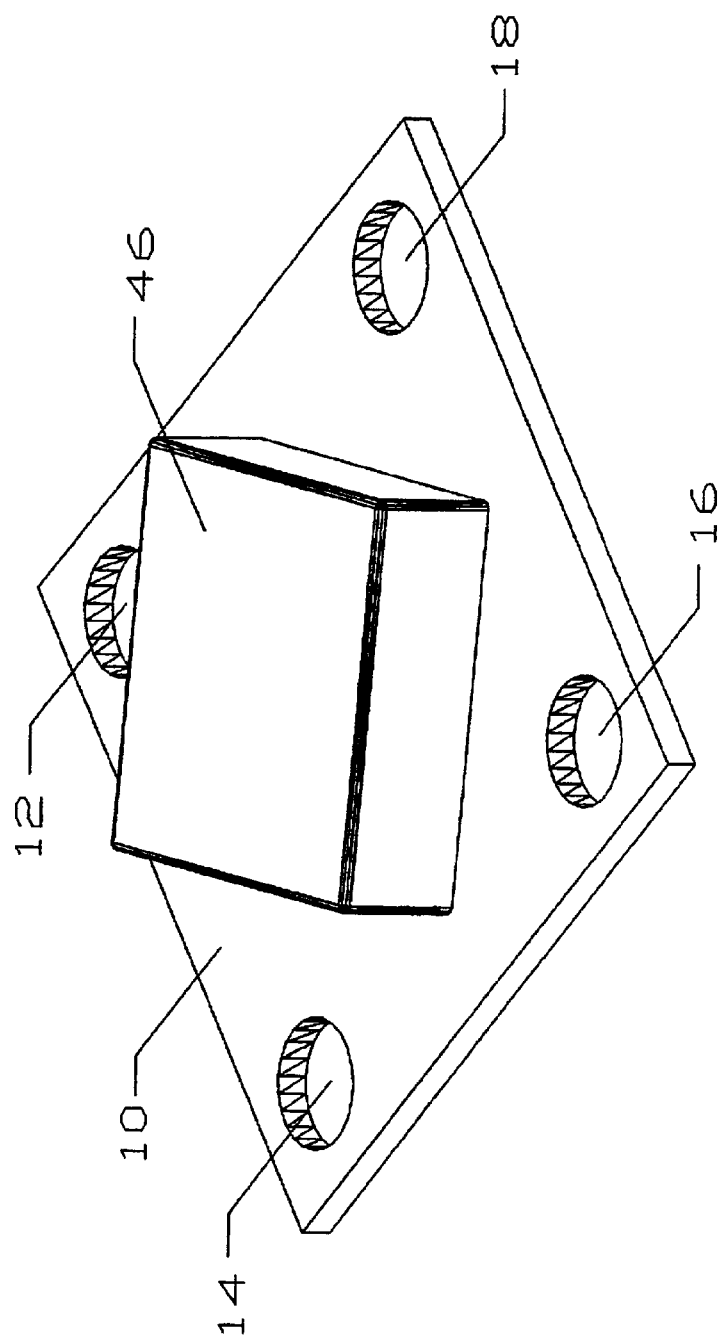
FIG. 5 is a perspective view of the load sensor of FIGS. 4A, 4B, and 4C with attached cover.

As shown in FIGS. 3A, 3B, 4A, 4B and 4C, four standoffs 28, 30, 32, 34 are mounted on the plate along lines bisecting opposing sides of the plate, and printed circuit board 36 is mounted on the standoffs so as to directly overlay the strain gauges and to sandwich them between the plate 10 and the printed circuit board 36. Leads 38 from the strain gauges are extended through lead-throughs 39 in the printed circuit board to connect to traces 13 on the distal surface of the board as illustrated in FIG. 4B.

Figure 8:
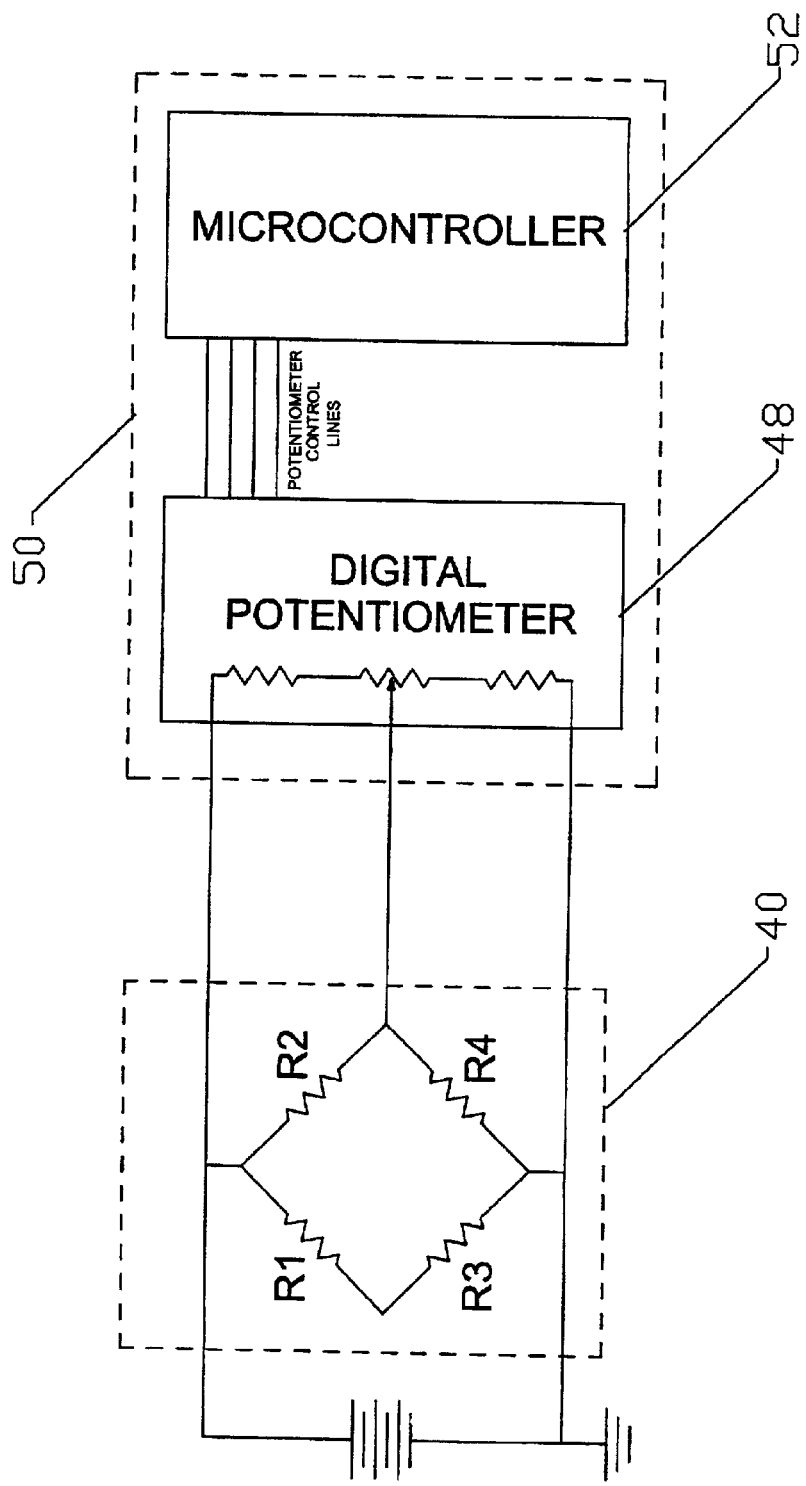
FIG. 8 is a diagram of the sensor and calibration circuits according to the preferred embodiment; and, FIG. 9 is a diagram of a web server load data delivery system according to the preferred embodiment of the invention.

The printed circuit board traces 13 define the circuit topology for a Wheatstone full bridge circuit 40, illustrated in FIG. 8. As is known in the art, a Wheatstone full bridge arrangement of the four elements in strain gauge 24 enables partial temperature compensation for the sensor. Furthermore, because the gauge elements of strain gauge 24 are located very close together and therefore each very close to the principal strain axis 20, sensitivity remains high. Additionally, the proximity of the elements to the temperature compensation axis 22 ensures that each of the gauge elements will be equally affected by temperature.

To further compensate for different temperature drifts for each of the strain gauge elements, temperature-compensating wire (not shown) may be inserted into the circuit on printed circuit board 36 as is known.

A square plastic cap or shell 46 is seated over the standoffs and printed circuit board assembly and is securely attached to the face of the plate by means of epoxy. The cap is oriented such that its corners lie along lines bisecting the straight sides of said plate.

In the preferred embodiment, the sensor plate 10 has a footprint of about 3 inches by 3 inches. As the dimensions of the plate get smaller, the relative size of the bolts secured in the mounting holes 12, 14, 16 and 18 becomes more significant and constrains the surface available for the strain gauge 24, the printed circuit board 36 and the cap 46. The diagonal configuration of the principal strain axis and temperature compensation axis in relation to the square plate maximizes the surface area available for the components. The corner mounting of the plate also maximizes the distance between the bolts and the strain gauges. Within a constrained area, and for relatively large bolts, this is important to avoid non-linearities that might be introduced by the local compression of the head of the bolt on the plate.

It is also desirable to have the mounting points of the plate along the principal strain axis be as far apart as possible to increase the sensitivity of the sensor. In a square plate, this is achieved by corner mounting according to the invention. The configuration of the invention also ensures that the plate is completely secured to the load structure. Corner mounting a square plate in a square (non-diagonal) configuration on a load structure would result in all four corners participating in applying strain to the plate, which introduces a level of complexity and potential non-linearity that is undesirable. However, mounting such a plate in a non-diagonal square configuration by fastening bolts in the middle of each side would limit the securement points along the compression axis to two points. However, this also results in unsecured corners of the plate, which introduces its own non-linear effects and reduces the sensitivity of the configuration.

It has also been found that the sensor assembly configuration according to the invention is particularly sensitive to strain along the principal strain axis while being relatively insensitive to temperature effects. It is believed that this is due to a combination of the shape of the plate and the fact that only two corners of the plate are secured along the principal strain axis. Compression or deflection along that axis induces no appreciable distortion along the perpendicular axis since both securement points (at the corners) lie directly on that axis. The arrangement of strain gauges along the diagonal axes of a square plate and the mounting of the plate in a diamond configuration along the principal strain axis of the load structure result in such increased sensitivity.

Figure 7:
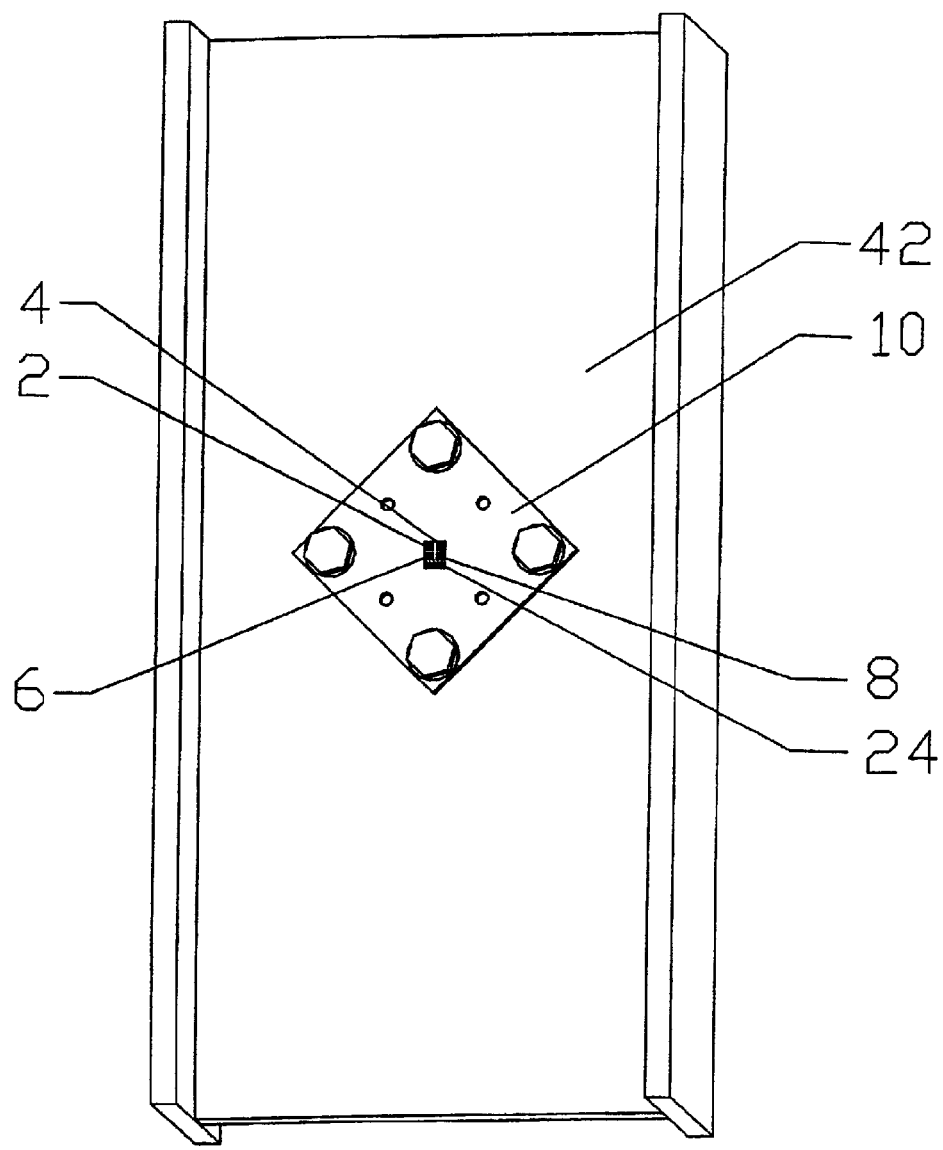
FIG. 7 is a perspective view of the load sensor of FIG. 1 bolted onto a vertical support structure.

The sensor assembly of the invention is simple and easy to install. As shown in FIG. 7, the unit is adapted to be readily mounted to a structure, such as vertical I-beam 42, for which the load is to be measured by drilling and tapping bolts into holes 12, 14, 16 and 18 of the plate 10, followed by a simple calibration process. The plate 10 and the strain gauge 24 are oriented on the I-beam 42 so as to sense strain along the vertical axis, which in this example would be the load bearing, or principal strain, axis. Accordingly, the plate 10 is arranged in a diamond configuration on the beam 42 so that the axis of sensitivity of the strain gauge is parallel to the vertical axis of the beam 42.

Calibration of the bridge is achieved by means of connection to a controller system 50 mounted in a housing in the general vicinity of the sensor. Controller system 50 includes digital potentiometer 48 connected in parallel with the Wheatstone bridge circuit 40. Upon activation of a "no load" calibration request from a user (e.g. by pushing an "empty" calibration button, not shown), a micro-controller 52 compares the output voltage from the bridge 40 to a preset value (typically zero for no load), and adjusts the digital potentiometer 48 until the preset value is read at the output. The digital potentiometer is then set at that value.

For a full load or strain calibration, the user pushes a "full" calibration button (not shown). Micro-controller 52 reads the output of the bridge and records that value in memory as a "full" reading. The micro-controller applies a linear function to interpolate varying loads between empty and full.

The system controller 50 may control a plurality of sensors at the controller location. The controller 50 provides the input voltage to the Wheatstone bridge 40, and further includes signal amplification and conditioning.

In the preferred embodiment, the controller 50 is used for a plurality of sensors mounted on support structures for material storage bins. For example, for a storage bin supported by four vertical support beams, at least one sensor could be placed on each support beam such that the compression axis of the strain gauge is aligned along the vertical axis (the principal strain axis for the beam). The controller then averages the readings received from each sensor so as to provide a more accurate end reading of the load status of the storage bin. Controller 50 also includes a display for indicating the load status of the bins, and includes a modem for communicating the load status to a remote base station server 60.

In a preferred application, the load sensor is used to measure the load in material storage bins that are regularly serviced, such as wood chip bins at a sawmill that are serviced by trucks that attend to retrieving material from the bins when they are full. The sensors according to the invention are bolted onto one or more vertical support beams (as shown in FIG. 7) of the bin and are calibrated for both the empty and full states of the bin (zero and full load settings respectively). The controller reads the output values of the bridges in the individual sensor plate assemblies and averages the apparent load status deduced from the sensor assemblies associated with each bin.

Figure 9:
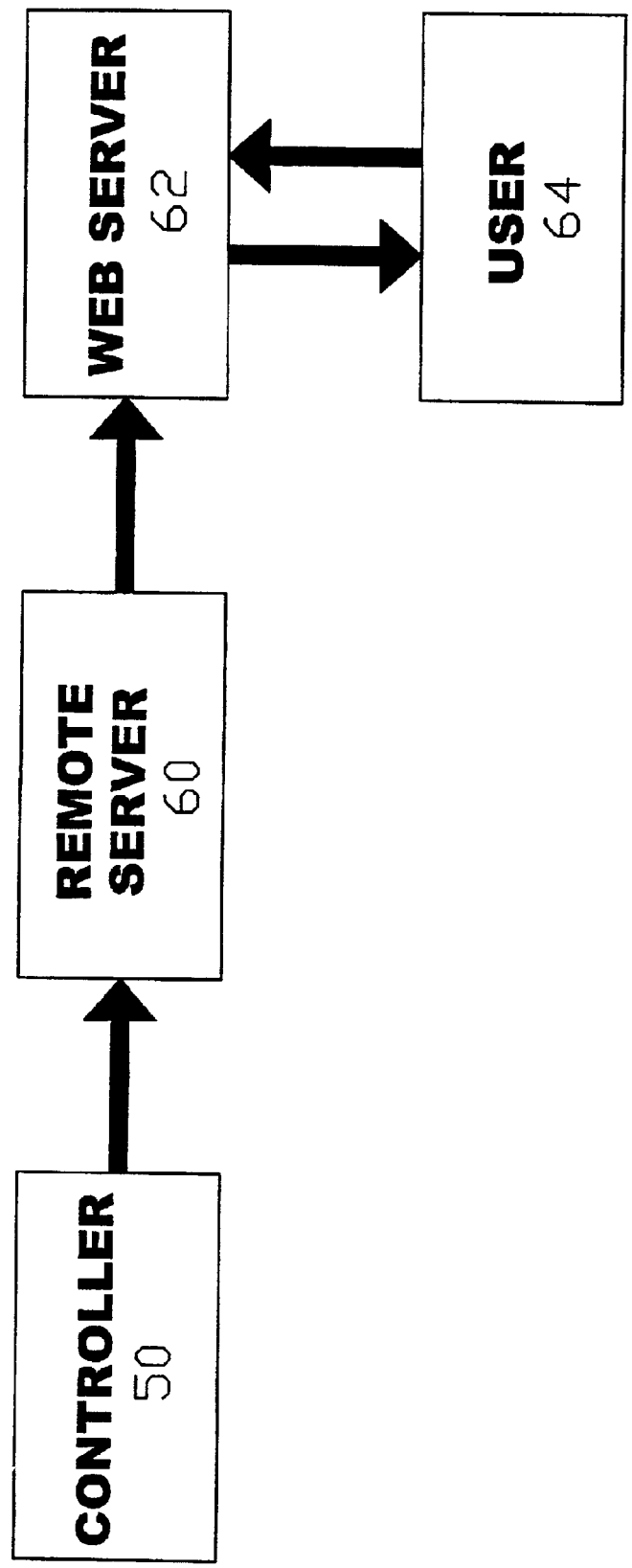

Referring to FIG. 9, the load status is communicated via an on-board modem to a remote base station server 60. Preferably the remote base station server 60 includes or is associated with a database of individual remote bins, containers or other structures for which load status is being monitored. The server 60 or a database management system associated with the database correlates the individual load status information received from remote controllers 50 to the individual bins, containers or other structures.

The data is formatted for presentation to a web server 62 to enable third parties 64, such as truckers wishing to attend to service the bins, to view the status of the bins on the Web. For such purposes, a simple indication that bins are empty, full or partly full is sufficient to determine whether to head to the bin location. According to the invention, a coarse indication of empty, full or partly full is sufficient for a wide variety of purposes, as well as being attainable with the load sensor and calibration system of the present invention.

As noted above, the controller 50 periodically determines load status of the various bins locally associated with the controller. Using the system of the invention, it is also possible to remotely poll the real-time load status of a particular container.

While the preferred embodiment of the invention has been described in terms of vertical support structures, it will be appreciated that the invention can also be used in structures where load or strain is to be measured along non-vertical axes.

It will be appreciated that while the preferred embodiment of the invention has been described, variations thereof may be practiced without departing from the essential elements of the invention, the scope of the invention being properly inferred from this disclosure and from the claims that follow.

What is claimed is:

1. A load sensor assembly, comprising:
   a substantially square plate;
   a hole in each of four corners of said plate for receiving a fastener therethrough;
   a first axis defined by a first pair of diagonally opposed ones of said holes;
   a second axis defined by a second pair of diagonally opposed ones of said holes;
   a strain gauge secured to said plate, wherein said strain gauge comprises at least two uniaxial strain elements, each of said two uniaxial strain elements having an axis of sensitivity, and wherein said two uniaxial strain elements are oriented within said strain gauge such that their respective axes of sensitivity are perpendicular to one another.

2. The load sensor of claim 1 wherein said strain gauge is secured to said plate such that one of said axes of sensitivity is parallel to said first axis and the other of said axes of sensitivity is parallel to said second axis.

3. The load sensor of claim 2 wherein said strain gauge is mounted on said plate so as to be substantially centered thereon.

4. The load sensor of claim 3 wherein said strain gauge comprises four uniaxial strain elements in a square pattern on said strain gauge, a first pair of diagonally opposed ones of said elements having axes of sensitivity oriented parallel to said first axis and a second pair of diagonally opposed ones of said elements having axes of sensitivity oriented parallel to said second axis.

5. The assembly of claim 4 further comprising:
   a plurality of standoffs mounted on said plate, said standoffs not lying on either said first or second axes;
   a printed circuit board mounted on said standoffs and overlaying said strain gauge;
   said printed circuit board containing traces defining a Wheatstone full bridge configuration including said four elements of said strain gauge, and lead-throughs for establishing electrical connection between said traces and a plurality of leads emanating from said strain gauge;
   said leads extending from said strain gauge through said lead-throughs;
   said plate having substantially straight sides; and,
   a cover mounted on said plate to cover said standoffs, printed circuit board and strain gauge, said cover being oriented such that its corners lie along lines bisecting the straight sides of said plate.

6. The assembly of claim 2 further comprising a cover having a square cross section is mounted to said plate to overlie said strain gauge, and wherein said cover is mounted such that each of its sides is perpendicular to either said first or second axis.

7. The assembly of claim 5 wherein said cover has a square cross section and is mounted such that each of its sides is perpendicular to either said first or second axis.

8. A method of detecting strain in a structure comprising mounting an assembly on said structure, said assembly comprising:
   a substantially square plate;
   a hole in each of four corners of said plate for receiving a fastener therethrough;
   a first axis defined by a first pair of diagonally opposed ones of said holes;
   a second axis defined by a second pair of diagonally opposed ones of said holes;
   a strain gauge secured to said plate, said strain gauge comprising four uniaxial strain elements in a square pattern on said strain gauge, a first pair of diagonally opposed ones of said elements having axes of sensitivity oriented parallel to said first axis and a second pair of diagonally opposed ones of said elements having axes of sensitivity oriented parallel to said second axis;
   said assembly being mounted by inserting fastening elements through said holes such that said first axis lies along a principal strain axis along which strain is to be measured.

9. A method of detecting strain in a structure comprising mounting an assembly on said structure, said assembly comprising
   a substantially square plate;
   a hole in each of four corners of said plate for receiving a fastener therethrough;
   a first axis defined by a first pair of diagonally opposed ones of said holes;
   a second axis defined by a second pair of diagonally opposed ones of said holes;
   a strain gauge secured to said plate, said stain gauge comprising four uniaxial strain elements in a square pattern on said strain gauge, a first pair of diagonally opposed ones of said elements having axes of sensitivity oriented parallel to said first axis and a second pair of diagonally opposed ones of said elements having axes of sensitivity oriented parallel to said second axis;
   a plurality of standoffs mounted on said plate, said standoffs not lying on either said first or second axes;
   a printed circuit board mounted on said standoffs and overlaying said strain gauge;
   said printed circuit board containing traces defining a Wheatstone full bridge configuration including said four elements of said strain gauge, and lead-throughs for establishing electrical connection between said traces and a plurality of leads emanating from said strain gauge;
   said leads extending from said strain gauge through said lead-throughs;
   said plate having substantially straight sides; and,
   a cover mounted on said plate to cover said standoffs, printed circuit board and strain gauge, said cover being oriented such that its corners lie along lines bisecting the straight sides of said plate;

said assembly being mounted by inserting fastening elements through said holes such that said first axis lies along a principal strain axis along which strain is to be measured.

10. A method of sensing the load in a container, said container having a structural element that is subject to a strain along a principal strain axis when the container is loaded comprising mounting a load sensor assembly on said structural element, said assembly comprising:

a substantially square plate;

a hole in each of four corners of said plate for receiving a fastener therethrough;

a first axis defined by a first pair of diagonally opposed ones of said holes;

a second axis defined by a second pair of diagonally opposed ones of said holes;

a strain gauge secured to said plate, said strain gauge comprising four uniaxial strain elements in a square pattern on said strain gauge, a first pair of diagonally opposed ones of said elements having axes of sensitivity oriented parallel to said first axis and a second pair of diagonally opposed ones of said elements having axes of sensitivity oriented parallel to said second axis;

said assembly being mounted on said structural element by inserting fastening elements through said holes such that said first axis lies along said principal strain axis.

11. A method of sensing the load in a container, said container having a structural element that is subject to a strain along a principal strain axis when the container is loaded comprising mounting a load sensor assembly on said structural element, said assembly comprising:

a substantially square plate;

a hole in each of four corners of said plate for receiving a fastener therethrough;

a first axis defined by a first pair of diagonally opposed ones of said holes;

a second axis defined by a second pair of diagonally opposed ones of said holes;

a strain gauge secured to said plate, said strain gauge comprising four uniaxial strain elements in a square pattern on said strain gauge, a first pair of diagonally opposed ones of said elements having axes of sensitivity oriented parallel to said first axis and a second pair of diagonally opposed ones of said elements having axes of sensitivity oriented parallel to said second axis;

a plurality of standoffs mounted on said plate, said standoffs not lying on either said first or second axes;

a printed circuit board mounted on said standoffs and overlaying said strain gauge;

said printed circuit board containing traces defining a Wheatstone full bridge configuration including said four elements of said strain gauge, and lead-throughs for establishing electrical connection between said traces and a plurality of leads emanating from said strain gauge;

said leads extending from said strain gauge through said lead-throughs;

said plate having substantially straight sides; and, a cover mounted on said plate to cover said standoffs, printed circuit board and strain gauge, said cover being oriented such that its corners lie along lines bisecting the straight sides of said plate;

said assembly being mounted on said structural element by inserting fastening elements through said holes such that said first axis lies along said principal strain axis.

* * * * *